Feb. 26, 1957

K. G. WESTIN 2,782,472

MOLDING MACHINES AND A METHOD OF
MANUFACTURING CASTING MOLDS

Filed April 9, 1953

4 Sheets-Sheet 1

INVENTOR
Karl Göran Westin
By

George H Corey

ATTORNEY

United States Patent Office 2,782,472
Patented Feb. 26, 1957

2,782,472

MOLDING MACHINES AND A METHOD OF MANUFACTURING CASTING MOLDS

Karl Göran Westin, Stockholm, Sweden, assignor to Aktiebolaget Westin & Backlund, Stockholm, Sweden, a corporation of Sweden Application April 9, 1953, Serial No. 347,739

Claims priority, application Sweden December 20, 1952

4 Claims. (Cl. 22—32)

This invention relates to the manufacture of casting molds used in foundries, and especially to a machine of the inversion or turnable type for the manufacture of molds and comprising a molding table and a squeezing plate associated therewith. The main object of the invention is to increase the working capacity and to facilitate the work of this type of machines by providing the machine with duplicate units of molding tables and squeezing plates which are mounted on a support adapted to be rotated around an axis. Thus, the machine has a pair of molding tables and a pair of squeezing plates and in each pair the tables and the plates, respectively, are mounted diametrically opposite one another relative to the axis of rotation. By rotation around this axis the two units may be caused to change their positions mutually.

It is a further object of the invention to provide a machine of the type described in which it is possible to operate by mounting a mold flask, filling it with sand and squeezing the sand at one of the units while, at the same time, separating of the pattern and removal of the finished mold is effected at the other unit.

A still further object of the invention is to provide a simple and effective method of manufacturing molds by means of a machine of this type.

Figure 1:
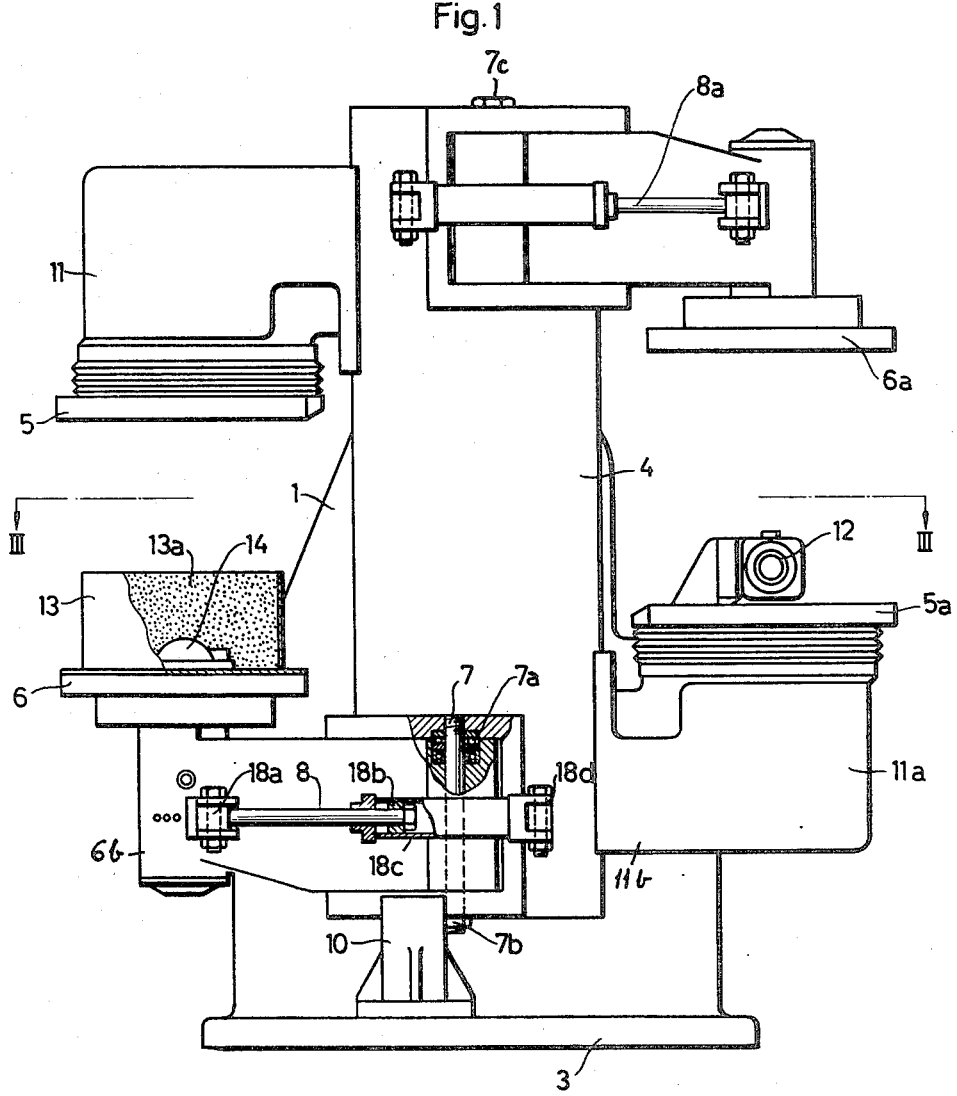
Figure 2:
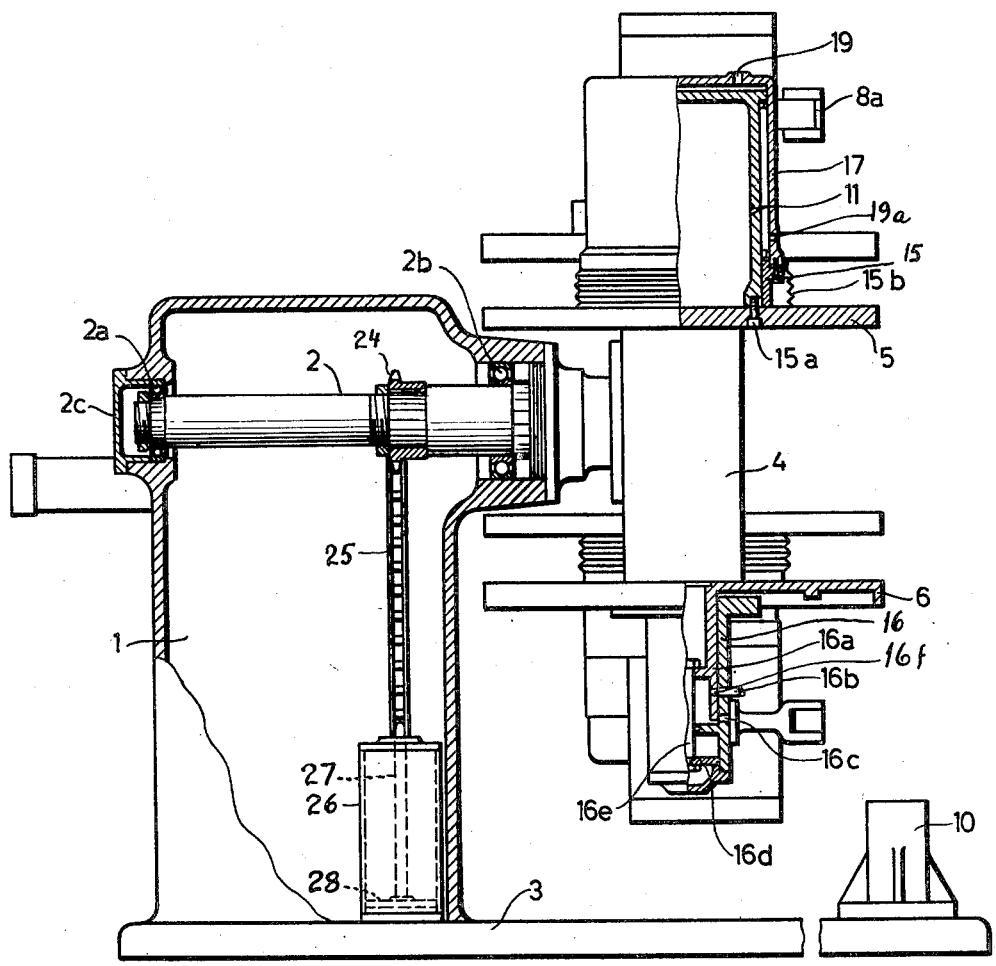
Figure 3:
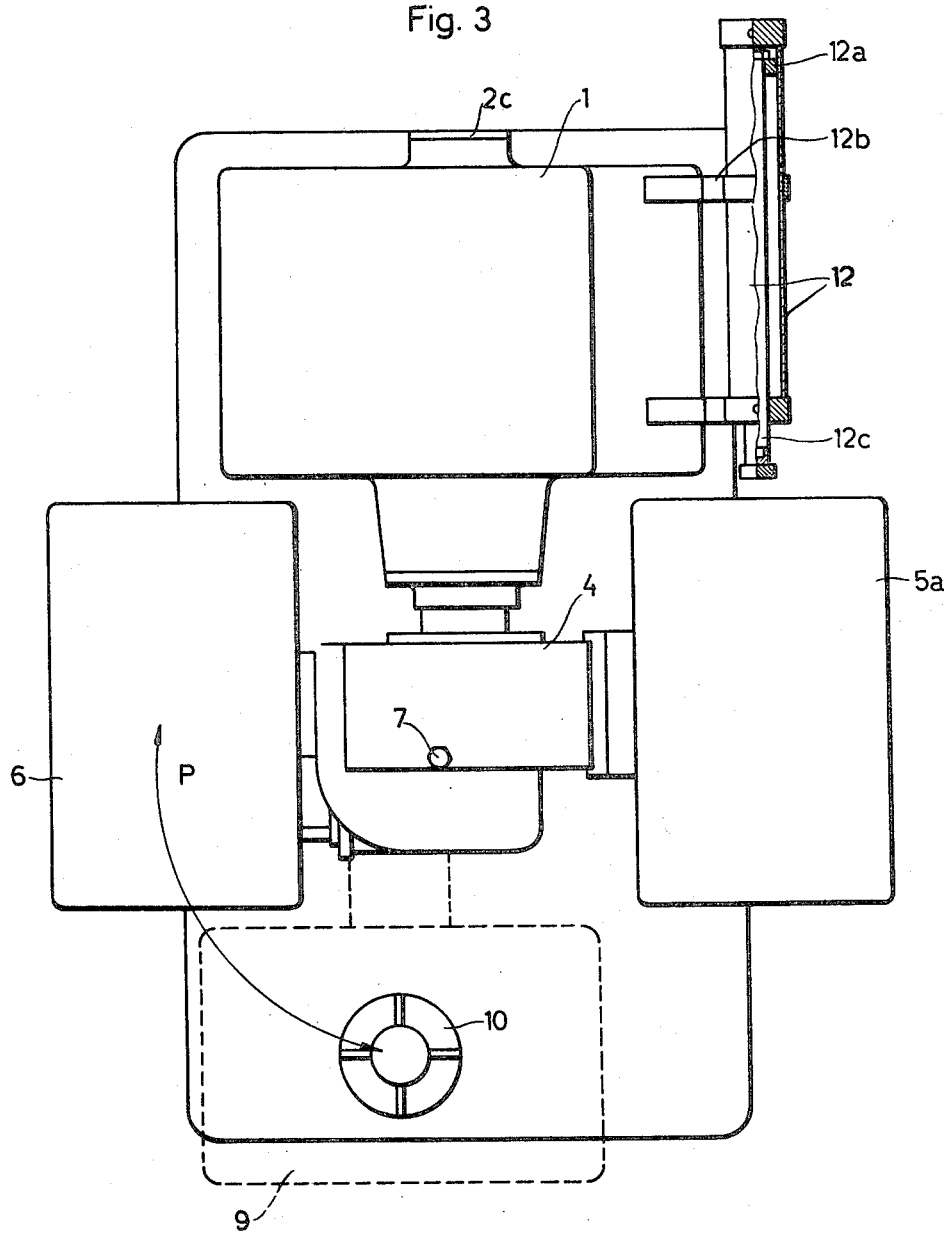
Figure 4:
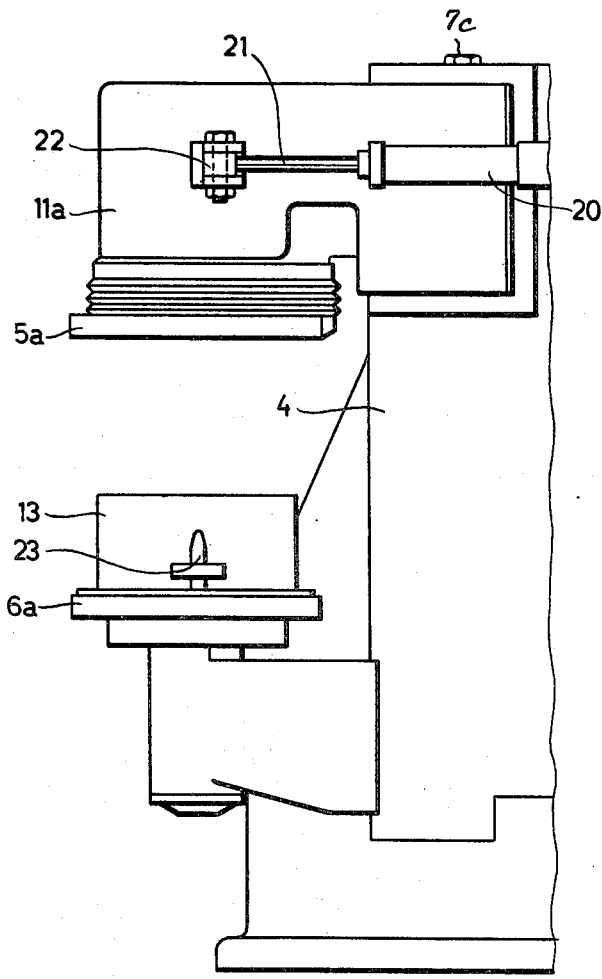

Two embodiments of a machine according to the invention are illustrated diagrammatically on the accompanying drawings, in which:

Figure 1 is an elevation of one embodiment of the machine, partly in vertical section, Figure 2 is a side view of the machine, partly in vertical section, Figure 3 is a plan view, partly in horizontal section on the line III—III in Fig. 1, Figure 4 is a fragmental view of another embodiment.

In the drawing the reference character 1 indicates a support having a base 3 and a horizontal rotary shaft 2 journalled in bearings 2a, 2b (Fig. 2). The external bearing 2a is protected by a cover 2c. Rotation of the shaft 2 may be effected by any suitable means. As an example the drawing shows that the shaft has a sprocket wheel 24 keyed thereto (Fig. 2) and over this sprocket wheel is laid a chain 25, each end of which is connected to a piston rod 27 of a piston 28 in a hydraulic or pneumatic cylinder 26. (Fig. 2 shows one of the cylinders and pistons only). It is easily understood that the chain 25 may be caused to rotate the shaft in one direction or the other on supplying hydraulic or pneumatic fluid at one side or the other of the pistons 28. One end of the shaft 2 projects through the support 1 and to the protruding end a column 4 is attached rigidly, said column carrying a pair of squeezing plates 5, 5a and a pair of mold tables 6, 6a. The squeezing plates 5, 5a are arranged diametrically opposite one another relative to the shaft 2, and in the same manner the mold tables 6, 6a are arranged diametrically opposite one another. If desired, each of the mold tables 6, 6a may be associated with a jolting device shown in Fig. 2. The jolting device comprises a cylinder 16 containing a jolting piston 16a integral with the mold table 6. Compressed fluid is supplied through an inlet 16b and a port 16f in the wall of the piston 16a. The pressure is built up in the cylinder and lifts the table 6 a small distance whereupon the supply of compressed fluid is shut off due to the fact that the communication between the inlet 16b and the port 16f is interrupted. At the same time the wall of the piston 16a uncovers a discharge port 16c in the wall of the cylinder so as to allow the compressed fluid to escape from the cylinder. As a result thereof the table 6 will descend again. In this manner the table is caused to vibrate or to jolt so that the sand in a flask mounted on the table is packed. The piston 16a has a spindle 16e connected to a piston 16d operating in a lower part of the cylinder 16. Compressed fluid may be supplied to the space above the piston 16d so as to hold the table 6 in the position shown in Figure 2. This arrangement serves to prevent the table 6 from descending when the table 6 is inverted.

The table 6a may be provided with a similar jolting apparatus. Preferably, each mold table 6, 6a is arranged to swing on a vertical shaft 7 journalled in bearings 7a in the column 4. A nut 7b or other means is provided to secure the shaft 7 in its place. An hydraulically or pneumatically operated rod 8 or any other type of drive is arranged to effect the swinging movement of the table 6 around its shaft 7. One end of the rod is pivoted at 18a to a bracket 6b carrying the table 6 and the other end of said rod is attached to a piston 18b adapted to operate in a hydraulic or pneumatic cylinder 18c which is pivoted to the column 4 (Fig. 1) at 18d. By supplying hydraulic or pneumatic fluid on one side of the piston 18b in the cylinder 18c the rod will swing the bracket 6b and the table 6 on the shaft 7 from a position right below the squeezing plate 5 to a position laterally thereof as shown by the arrow P and the dashed lines at 9 in Fig. 3. On supplying the fluid on the other side of the piston the table 6 will be swung in the reverse direction. A substantially identical arrangement 8a is provided for the mold table 6a. As a rule it is necessary to provide for a pivoted mounting of the mold tables 6, 6a in this manner because in normal cases the space below the corresponding squeeze plate 5, 5a is too small to enable a mold flask to be placed on the table and filled with sand, and it is therefore convenient to carry out these operations in the lateral positions 9 of the mold tables.

Instead of mounting the mold table swingably around a vertical axis the corresponding squeezing plate may be mounted swingably in a similar manner relative to the mold table. Fig. 4 illustrates an embodiment of this kind. In this case the mold table 6a is mounted in a stationary manner on the column 4 while the squeezing plate 5a is mounted to swing on a vertical shaft 7c identical with shaft 7 in Fig. 1. Driving elements 20, 21, 22 are provided, identical with elements 18c, 8 and 18a in Fig. 1. The construction according to Fig. 4 should be easily understood without any detailed description.

Each of the squeezing plates 5, 5a is operated by a squeezing device comprising a cylinder 11, 11a, respectively secured to a support 11b. As shown in Fig. 2 the cylinder 11 contains a piston 17 operated by hydraulic or pneumatic fluid supplied through a port 19 on one side of the piston 17 when it is desired to move the piston downwardly and through a port 19a when it is desired to lift the piston. Port 19a serves as outlet when port 19 is an inlet and vice versa. Screws 15a or similar elements are provided to secure the piston to the squeezing plate 5.

Secured to the cylinder 11 is a collar 15 with which the lower end of the piston makes a tight fit. For preventing leakage of fluid from the cylinder the lower end thereof is surrounded by a bellows 15b at one end secured to the cylinder and at the other end to the plate 5 and adapted to expand on the downward movement of said plate.

An identical squeezing arrangement is provided for the squeezing plate 5a.

A jolting support 10 may be mounted on the base plate 3. If the mold tables 6, 6a have no jolting device 16—16f such a jolting device may be mounted on the support 10.

In the operation of the mold machine now described the table 6 is first swung to the position 9 and a mold flask 13 with a pattern 14 is placed on said table (Fig. 1). The pattern 14 is secured to a pattern board which is secured to the mold table 6 by means of guiding pins or bolts 23 (indicated in Fig. 4) or the pattern board may be fixed to the flask which in turn is secured to the table 6 by means of such bolts. Sand 13a is filled into the flask and, if desired, a squeezing board is placed on the top of the flask whereupon the mold table 6 is returned to its original position right below the squeezing plate 5. Now the squeezing plate is pressed downward by means of the squeezing device 11 described so as to squeeze the sand in the flask 13. The shaft 2 is rotated half a revolution by means of the mechanism 24—28 so that the squeezing plate 5 and the mold table 6 now occupy a diagonally opposite position that is to say, they are carried to the positions occupied by the squeezing plate 5a and mold table 6a, respectively as shown in Fig. 1 while the plate 5a and table 6a now occupy the positions of plate 5 and table 6, respectively, according to Fig. 1. Now the separation of the pressed mold from the pattern is effected by lowering the squeezing plate 5. The pattern and the pattern board remain on the inverted mold table 6 while the sand mold now resting on the squeezing plate 5 is removed together with the flask in any suitable manner, for instance by means of a reciprocatable push rod 12c (Fig. 3) actuated by a piston 12a in a hydraulic or pneumatic cylinder 12 which is secured to brackets 12b and connected to a suitable source of hydraulic or pneumatic fluid so as to reciprocate the piston 12a. Of course, this device may be constructed in many different manners.

At the same time as the parting operation and the removal of the flask and the mold is effected at the plate 5 and the table 6 in the manner now described, a new flask may be mounted and sand filled therein at the opposite mold table 5a and squeezing be effected by means of the associated squeezing plate 6a.

After having removed the mold in the pattern separating position the shaft 2 is rotated half a revolution so as to carry the mold table 5a and the squeezing plate 6a to the pattern separating position, and at the same time the mold table 5 and the squeezing plate 6 are returned to their orginial positions as shown to the left in Fig. 1. Thus the advantage of the mechine described is that the operator need not wait for completion of the pattern separating operation and removal of the flask and mold until he can fill a new flask and squeeze the sand therein. Consequently, the working capacity of the machine is increased and the working operations facilitated and may be effected more rapidly. Moreover, it is possible, in one and the same machine to make both the upper and lower parts of a final mold which in most cases is effected in two separate machines.

The machine may be constructed for manual operation or for automatic or semi-automatic operation, the impulses for the inversion movement, the squeezing movement, the pattern drawing the removal of the mold etc. being transmitted according to a predetermined time scheme.

What I claim is:

1. A mold machine for the manufacture of casting molds comprising in combination two squeezing and pattern separating units, a rotatable shaft carrying said units, each unit including a mold table and a squeezing plate arranged in opposed relation thereto, said units being disposed diametrically opposite one another on opposite sides of the axis of said shaft with the mold table and the squeezing plate of one unit in inverted relation to the corresponding elements of the other of said units, and means for rotating said shaft so as to change the relative positions of said units between a mold-forming position and a pattern-separating position whereby patterns may be separated automatically while a single skilled operator continuously forms molds, said pattern-separating being effected in one unit while said mold-forming is being effected in the other unit.

2. A mold machine as claimed in claim 1 wherein each mold table is journalled swingably relative to the associated squeezing plate in each unit around an axis substantially perpendicular to said shaft.

3. A mold machine as claimed in claim 1 wherein each squeezing plate is journalled swingably relative to the associated mold table in each unit around an axis substantially perpendicular to said shaft.

4. A method of manufacturing casting molds comprising the steps of placing a flask with pattern on a mold table, filling sand into the flask, squeezing the sand in the flask by means of a squeezing device, rotating the mold table, the flask and the squeezing devices as one unit into an inverted position, at the same time rotating a second unit of a mold table and a squeezing device about a common supporting member for said units into the position previously occupied by the first-mentioned unit, and separating in said inverted positions, the flask and pattern from the mold produced, said second unit at the same time being ready for receiving a flask to be filled with sand and subjected to the squeezing operation.

References Cited in the file of this patent
UNITED STATES PATENTS

| | | |
|---|---|---|
| 444,588 | Carlin | Jan. 13, 1891 |
| 1,910,354 | Nicholls | May 23, 1933 |
| 2,652,608 | Mezger | Sept. 22, 1953 |